United States Patent [19]

Redfern

[11] 4,194,194
[45] Mar. 18, 1980

[54] PIEZOELECTRIC VIBRATION DETECTOR FOR SENSING A NEARBY INTRUDER

[75] Inventor: John T. Redfern, La Jolla, Calif.

[73] Assignee: The United States of America as represented by the Secretary of the Navy, Washington, D.C.

[21] Appl. No.: 873,200

[22] Filed: Jan. 30, 1978

[51] Int. Cl.² ............... G08B 13/00; H01L 41/10; H04R 17/00
[52] U.S. Cl. ................... 340/566; 310/332; 310/338; 310/345; 310/357; 340/665
[58] Field of Search ............. 340/565, 566, 665; 310/328, 332, 338, 345, 357; 174/37, 38

[56] References Cited

U.S. PATENT DOCUMENTS

| 3,433,982 | 3/1969 | Kaname et al. | 310/357 |
| 3,798,474 | 3/1974 | Cassand et al. | 310/338 X |
| 3,806,908 | 4/1974 | Bound et al. | 340/566 X |
| 3,946,398 | 3/1976 | Kyser et al. | 310/332 X |

*Primary Examiner*—John W. Caldwell, Sr.
*Assistant Examiner*—Joseph E. Nowicki
*Attorney, Agent, or Firm*—Richard S. Sciascia; Ervin F. Johnston

[57] ABSTRACT

An intrusion sensor uses thin film piezoelectric transducers to sense nearby mechanical vibrations. A hose-like sheath contains a pair of insulating strips which carry conductive leaves on their outer surfaces. A series of longitudinally arranged segments of a thin film piezoelectric material are coupled to the leaves to provide signals representative of impinging mechanical vibrations. Since adjacent ones of the thin film segments are alternately polarized, signals are created only when the vibrations are nearby. Greater sensitivity to nearby vibrations is assured when each of the segments is fabricated from several layers of the thin film piezoelectric material.

2 Claims, 4 Drawing Figures

CONDUCTOR

INSULATIVE STRIP

PIEZOELECTRIC SEGMENTS

INSULATIVE STRIP

CONDUCTOR

PIEZOELECTRIC VIBRATION DETECTOR FOR SENSING A NEARBY INTRUDER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Development of pressure or vibration sensing devices for area security is progressing at a rapid rate. Cruder forms of these intrusion sensors have demonstrated a certain degree of success. Usually the intrusion sensors assume the form of an elongate, hose-like structure having a number of vibration sensitive devices located along its length. A noteworthy example of a system of this type is disclosed in U.S. Pat. No. 3,806,908 issued to Lloyd R. Bound on Apr. 23, 1974. His system uses a number of piezoelectric transducers and wires contained in or connected to a buried cable. Another pair of interesting approaches is disclosed in the U.S. Pat. No. 3,832,704 issued to Vahram S. Kardashian on Aug. 27, 1974 and the U.S. Pat. No. 3,882,441 issued to James O. Holman et al on May 6, 1975. Both approaches rely on the interaction of magnetostrictive film plated wires to sense external disturbances and a location of a possible intruder. Still another intrusion detection system was designed by Robert F. Bell et al and patented on Sept. 3, 1974 in U.S. Pat. No. 3,833,897. A coaxial electrical cable converts mechanical vibrations to representive signals capable of being monitored at a remote station. The signals generated are distinctive sounds made by an intruder either climbing or cutting through a chain link fence. Provision is made for a loud speaker or an alarm generator to indicate where an intrusion has occurred.

All of the aforeidentified detection systems represent meritorious advances in the state-of-the-art; however, they all are bulky and tend to be expensive and preclude their use in a vast number of situations.

One seismic sensor that could lend itself to adaption as an intrusion sensor is disclosed in U.S. Pat. No. 3,798,474 issued to Jean Cassand et al and which is entitled Pressure Wave Piezoelectric Sensor of Continuous Structure. The pressure sensitive element is formed of a flexible strip of a piezoelectric plastic material for sensing seismic disturbances. The most common embodiment uses one or more of the pressure sensitive elements, each extending a considerable length to sense remote seismic disturbances. A modification reverses the polarities of the side-by-side longitudinally extending pressure sensitive elements to nullify the parasitic charges attributed to longitudinal flexure. Because of the length and electrical coupling of the pressure sensitive elements it is doubtful that it could differentiate between remote disturbances and those within a few feet of a buried or immersed intrusion device.

Thus, there is a continuing need in the state-of-the-art for an intrusion detector that is not unduly bulky, is not too sensitive to make it useless for close-in detection, is not too expensive and is relatively easily stored and deployed.

SUMMARY OF THE INVENTION

The present invention is directed to providing an apparatus for sensing a mechanical vibration representative of a nearby intruder. An elongate sheath has an oblong cross-sectional configuration due to a pair of insulator strips extending its length. A pair of conductive leaves or coatings are supported on the outside of the strips and are electrically coupled to a number of segments of a piezoelectric film. The segments are longitudinally arranged in an alternately polarized relationship along the length of the apparatus to reduce the possibility of producing signals representative of distant disturbances.

It is an object of this invention to provide an improved intrusion sensor.

Still another object of the invention is to provide an intrusion sensor employing a thin film piezoelectric plastic as the active element.

Still another object is to provide an intrusion sensor in which the active element is configured and arranged to preclude the sensing of distant disturbances.

Yet a further object is to provide a sensor having thin film piezoelectric segments alternately polarized to indicate nearby intrusions.

A further object is to provide an intrusion detector having an oblong, reduced cross-section to facilitate storage and deployment.

Yet another object is to provide a water tight intrusion device to allow its being buried or immersed for long periods of time.

These and other objects of the invention will become more readily apparent from the ensuing specification when taken with the drawings.

DESCRIPTION OF THE PREFERRED EMBODIMENT

Figure 1:
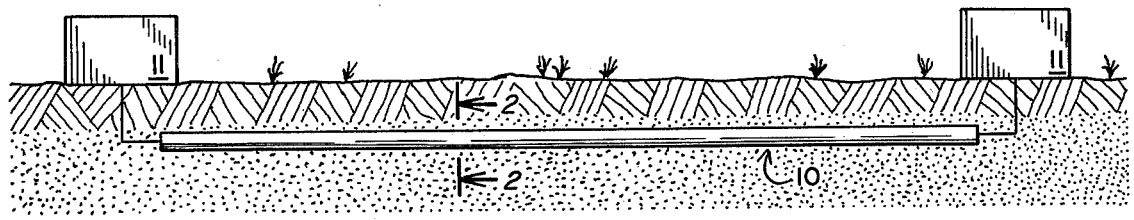
FIG. 1 depicts deployment of a section of the invention.

Referring now to FIG. 1 of the drawings an intrusion or pressure detector 10 is buried a few inches below the surface of the ground and extends between a pair of electronic packages 11. In the embodiment to be described it is fabricated to provide an indication of an intrusion or the mechanical vibrations attributed to footfalls or vehicular traffic between the two electronic packages. Obviously, a number of the detectors could be connected end-to-end along an areas perimeter to provide a high degree of security. Suitable multiplexing techniques could be relied upon to detect at which portion along the perimeter an intrusion occurs. The monitoring technique relied upon is beyond the scope of this inventive concept which concerns itself to providing a detector which tends to cancel distant pressure fields and gives an indication of a nearby intrusion.

Figure 2:
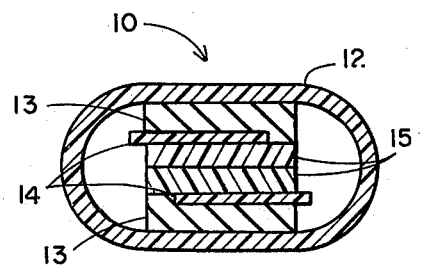
FIG. 2 shows the invention taken in cross-section along lines 2—2 in FIG. 1.

The detector can be regarded as having a hose-like configuration with an oblong cross-sectional shape, see FIG. 2. A continuous watertight sleeve 12 holds the rest of the elements of the detector close together and protects them from moisture, contamination etc. The sheath is a plastic or rubber-like material that assures protection of the contained elements.

Two of the elements within the sleeve are an upper and lower conductive leaf 13. These leaves continuously extend the length of the detector and have a lateral dimension that extends beyond the lateral reaches of an upper and lower insulator strip 14. The insulator strips, like both of the conductive leaves, extend the entire length of the detector. The conductive leaves are foil-like or stamped-thin metal strips to transmit signals representative of an intrusion to the electronics packages. Similar to the insulator strips, the conductive leaves are flexible to permit the storage of the detector in a rolled-up coil and to facilitate deployment of the detector across the irregular contours.

Figure 3:
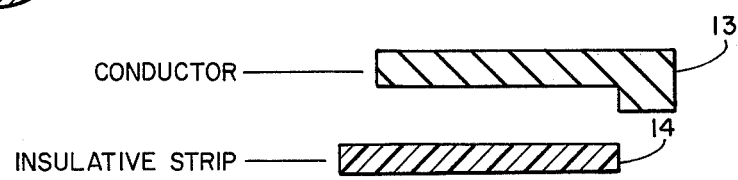
FIG. 3 shows a schematic representation of the elements contained within the sheath.
Figure 3:
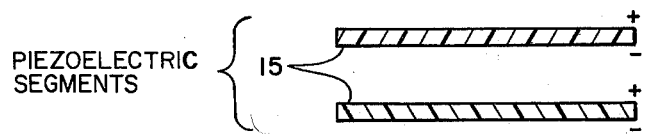
Figure 3:
Figure 3:
Figure 4:
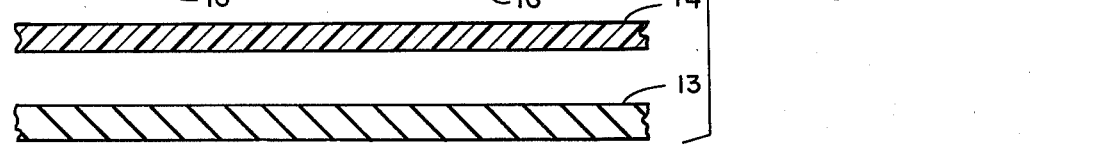
FIG. 4 depicts a longitudinal representation of the invention showing alternarely polarized adjacent thin film piezoelectric segments.

Sandwiched between the conductive leaves and insulator strips is at least one layer of a plastic film piezoelectric segment 15, two layers of which are shown in FIGS. 2, 3, and 4. A typical piezoelectric film that could be selected is marketed under the trade designation of KF PIEZO FILM by the Kreha Corporation of America in New York, N.Y. The film comes in a variety of thicknesses with a nine micron thickness functioning quite suitably in the instant detector. The film is polarized as depicted in FIGS. 3 and 4 to generate a signal when it is put in compression. This signal is fed via the conductive leaves to the electronics packages for processing.

Noting in particular, FIG. 4 which depicts a short length of the detector, the piezoelectric plastic film is cut into a number of segments 15 separated longitudinally by spaces 16. Dimensioning nine or ten micron thick film segments with about a one-half inch widths and a two inch lengths provided satisfactory intrusion detection capabilities.

Looking to FIG. 4, it should be emphasized that the adjacent pairs of segments are alternately polarized. This gives the detector a capability for sensing nearby vibrations and tends to cancel distant pressure fields. To elaborate, an intruder walking near or immediately above a detector (or a swimmer swimming close by the detector in an underwater deployment) will produce vibrations which are sensed and relayed to the electronics packages. Any distant disturbances for example, a distant explosion, earthquake, etc. will be nullified by the interfering signals produced by the discrete, separated piezoelectric segments. Thus, this detector is specifically designed and fabricated to sense the mechanical vibrations attributed to an intruder in the immediate area.

The embodiment depicted and thusly described employed only a pair of layers of the piezoelectric segments. In a modification of this inventive concept only a single layer might be wanted or many layers depending on the sensitivity and capacitance parameters in a given application.

Obviously, many modifications and variations of the present invention are possible in the light of the above teachings, and, it is therefore understood that within the scope of the disclosed inventive concept, the invention may be practiced otherwise than specifically described.

What is claimed is:

1. An apparatus for sensing a mechanical vibration which is representative of a nearby intruder comprising:
   an elongated sheath;
   a pair of top and bottom elongated conductors located within the sheath and extending therealong in a vertically spaced apart relationship;
   a layer of segments of piezoelectric film mounted in a longitudinally spaced apart relationship between said pair of conductors;
   a strip of insulative material mounted between the top conductor and a top side of each piezoelectric segment, and another strip of insulative material mounted between the bottom conductor and the bottom side of each piezoelectric segment;
   the strips of insulative material being offset from opposite edges of the layer of piezoelectric segments;
   each conductor having an inwardly extending projection within the respective offset of insulative material to electrically connect with respective top and bottom portions of each piezoelectric segment; and
   the piezoelectric segments being arranged in an alternately polarized relationship along the sheath,
   whereby nearby vibrations of an intruder will activate the closest piezoelectric segment to cause a signal on the conductors while distant vibrations will be nullified.

2. An apparatus as claimed in claim 1 including:
   a pair of layers of said piezoelectric segments arranged in a top and bottom relationship within the sheath; and
   respective pairs of top and bottom piezoelectric segments along the layers being in engagement with respect to one another.

* * * * *